US007342168B2

(12) United States Patent
Setoguchi

(10) Patent No.: US 7,342,168 B2
(45) Date of Patent: Mar. 11, 2008

(54) SOUND EFFECTER, FUNDAMENTAL TONE EXTRACTION METHOD, AND COMPUTER PROGRAM

(75) Inventor: Masaru Setoguchi, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 11/355,702

(22) Filed: Feb. 16, 2006

(65) Prior Publication Data

US 2006/0193478 A1 Aug. 31, 2006

(30) Foreign Application Priority Data

Feb. 28, 2005 (JP) ............................ 2005-054481

(51) Int. Cl.
*G10H 7/12* (2006.01)
*H02M 5/297* (2006.01)

(52) U.S. Cl. ............................ 84/619; 84/616; 381/61

(58) Field of Classification Search ................ 704/204; 381/61; 84/616, 619, 657
See application file for complete search history.

(56) References Cited

U.S. PATENT DOCUMENTS 5,641,926 A 6/1997 Gibson et al.
5,862,232 A * 1/1999 Shinbara et al. .............. 381/61

FOREIGN PATENT DOCUMENTS

JP 2-137900 A 5/1990
JP 2753716 B2 3/1998

OTHER PUBLICATIONS

Abeysekera S S: "Multiple pitch estimation of poly-phonic audio signals in a frequency-lag domain using the bispectrum" Circuits and Systems, 2004. ISCAS '04. Proceedings of the 2004 International Symposium on Vancouver, BC, Canada. May 23-26, 2004, Piscataway, NJ, USA. IEEE, US, May 23, 2004, pp. III-469.*

(Continued)

*Primary Examiner*—Lincoln Donovan
*Assistant Examiner*—Andrew Millikin
(74) *Attorney, Agent, or Firm*—Frishauf, Holtz, Goodman & Chick, P.C.

(57) ABSTRACT

The present invention provides a technique for shifting pitch to target pitch without detecting the original pitch directly, and for extracting the pitch of the audio waveform exactly. A phase compensator extracts 2 or more frequency channels each having frequency components of a harmonic overtone whose frequency is 1 or more times as higher than frequency of a fundamental tone of the original sound, from the frequency channels from which the frequency components are extracted by fast Fourier transform. The phase compensator calculates a scaling value to be used for converting the fundamental tone to another target fundamental tone, and performs phase compensation in accordance with the scaling value. A pitch shifter performs pitch scaling in accordance with the scaling value onto the audio data resultant from inverse fast Fourier transform onto the phase compensated frequency components. Thus, audio data representing the target fundamental tone are generated.

6 Claims, 7 Drawing Sheets

BLOCK DIAGRAM SHOWING FUNCTIONS OF THE SOUND EFFECTER ACCORDING TO THE EMBODIMENT

OTHER PUBLICATIONS

T. Nearey: "Ling 512 Basic Acoustics Supplementary notes part (v 1.0, Jan. 19, 2005)" [online], Jan. 19, 2005, University of Alberta Dept. of Linguistics, Edmonton, Canada, XP002384160, Retrieved from the Internet: URL:http:/www.ualberta.ca{tnearey/ Ling512Gpu/files/BasAcousH019Jan05.pdf> [retrieved on May 24, 2006] p. 5, paragraphs 2,3.

Abeysekerea S S: "Multiple pitch estimation of poly-phonic audio signals in a frequency-lag domain using the bispectrum", Circuits and Systems, 2004, ISCAS '04, Proceedings of the 2004 International Symposium on Vancouver, BC, Canada, May 23-26, 2004, Piscataway, NJ, USA, IEEE, US May 23, 2004, pp. III-469, XP010719318, ISBN: 0-7803-8251-X, pp. III-469, right-hand column, paragraph 2.

* cited by examiner

BLOCK DIAGRAM SHOWING ELECTRONIC MUSICAL INSTRUMENT HAVING THE SOUND EFFECTER ACCORDING TO THE EMBODIMENT

BLOCK DIAGRAM SHOWING FUNCTIONS OF THE SOUND EFFECTER ACCORDING TO THE EMBODIMENT

FLOWCHART OF GENERAL PROCESSING

FLOWCHART OF PHASE COMPENSATION

FLOWCHART OF SCALING VALUE CALCULATION

SOUND EFFECTER, FUNDAMENTAL TONE EXTRACTION METHOD, AND COMPUTER PROGRAM

This application is based on Japanese Patent Application No. 2005-54481 filed on Feb. 28, 2005, including the specification, claims, drawings and summary thereof. The disclosure in Japanese Patent Application No. 2005-54481 is incorporated herein by reference in its entirety.

FIELD OF THE INVENTION

The present invention relates to a sound effecter which analyzes first audio waveform and generates second audio waveform by applying sound effect onto the first audio waveform based on the analysis.

DESCRIPTION OF THE RELATED ART

There are various sound effectors to generate sounds onto which sound effects are applied after analyzing audio waveform of the original sounds. Some of them have a pitch shifter function which shifts pitches of fundamental tones that appear in the waveform. Japanese Patent No. 2753716 is an example of one such sound effecter in the prior art.

Such a sound effecter usually shifts pitch to generate effected waveform in order to adjust the pitch to a target pitch. In such a case, generally, the sound effecter detects pitch appearing in original waveform (that is, fundamental frequency) directly and carries out pitch scaling so as to adjust the detected pitch to the target pitch.

It is known that a tone having the fundamental frequency (that is, a fundamental tone) is a sound component generally showing the highest level among other sound components. However, there are some exceptional cases. For example, in the sounds generated by plucked string instruments such as a guitar or struck string instruments such as a piano, level of a second harmonic overtone (a tone which is 1 octave higher than the fundamental tone) is often higher than that of the fundamental tone. Therefore, the conventional direct detection may fail to detect the precise pitch of the fundamental tone. According to such a situation, it is important to find out a solution to shift pitch without detecting the pitch appearing in the original waveform.

It is an object of the present invention to provide a technique to achieve precise pitch shifting without direct detection of the pitch.

It is another object of the present invention to provide a technique to extract pitch in the waveform exactly.

SUMMARY OF THE INVENTION

To achieve the above objects, the present invention extracts frequency components at every frequency channel after analyzing frequencies of a first waveform frame by frame; extracts 2 or more frequency channels having frequency components of a harmonic overtone whose frequency is at least 1 or more times higher than that of the first waveform; calculates a greatest common divisor among frequencies corresponding to the extracted 2 or more frequency channels; determines parameters for fundamental tone conversion based on the calculated greatest common divisor; and generates a second waveform by converting the fundamental tone in the first waveform with using the determined parameters.

A harmonic overtone has a frequency which is integer number times higher than that of a fundamental tone. Under this fact, the greatest common divisor among the frequencies corresponding to 2 or more frequency channels including frequency components of the harmonic overtone (harmonic channel) will be handled as information showing frequency of the fundamental tone. That is, such the greatest common divisor is helpful for generating the second waveform representing a target fundamental tone after exactly shifting the fundamental tone of the first waveform. This method avoids extracting (detecting) a fundamental tone of the first waveform. Therefore, it is able to generate the second waveform having the target fundamental tone, even if the fundamental tone in the first waveform is missed (so called, missing fundamental) or the frequency of the fundamental tone in the first waveform is very poor rather than other frequencies. On the otherwise, the greatest common divisor of the present invention is also helpful for exactly extracting (detecting) the frequency of the fundamental tone in the first waveform.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiments of the present invention will now be described with reference to drawings.

Figure 1:
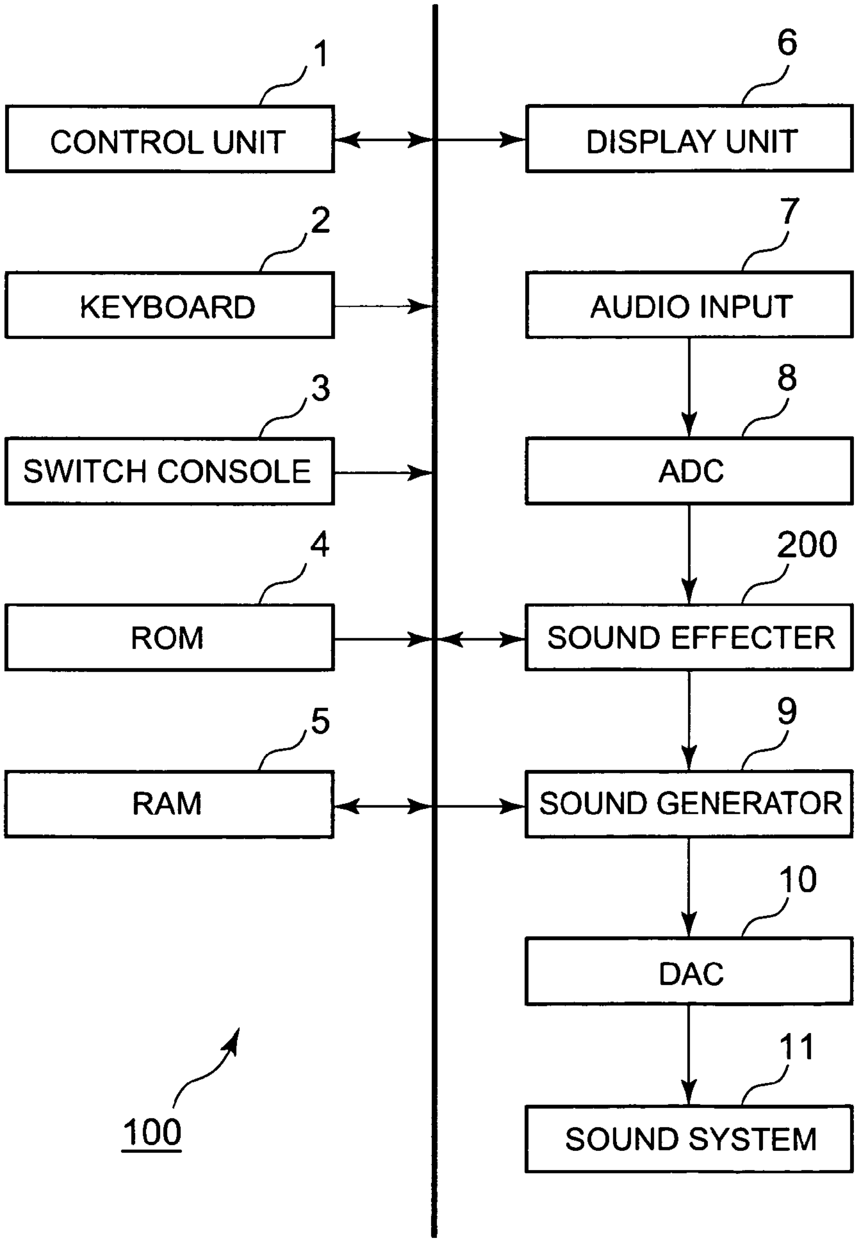
FIG. 1 is a block diagram showing the structure of an electronic musical instrument having a sound effecter according to the embodiment.

FIG. 1 is a block diagram exemplifying the structure of an electronic musical instrument 100 having a sound effecter 200 according to the present invention.

As shown in FIG. 1, the electronic musical instrument 100 comprises a control unit 1, a keyboard 2, a switch console 3, a ROM 4, a RAM 5, a display unit 6, an audio input 7, an ADC 8, a sound generator 9, a DAC 10, a sound system 11, and the sound effecter 200.

The control unit 1 may comprise a CPU (Central Processing Unit) for controlling whole of the instrument.

The keyboard 2 comprises piano like keys as a user interface for playing music.

The switch console 3 comprises various kinds of switches to be operated by a user for settings. In addition to such the user operable switches, the switch console 3 may have detector circuits for detecting states of the user operable switches.

The ROM 4 is a Read Only Memory which stores programs to be executed by the control unit 1, various control data, and the like.

The RAM 5 is a Random Access Memory to be used as a work area for the control unit 1.

The display unit 6 may comprise, for example, a liquid crystal display (LCD) panel and a plurality of LEDs.

The audio input 7 is a terminal for inputting analog audio signal. For example, a microphone or other musical instruments will be connected thereto, and human voices or sounds generated by the other instruments are input through the audio input 7. The audio input 7 may comprise a digital communication device to obtain audio source from external storages or via communications network such as LAN (Local Area Network) and public network (i.e. Internet). In this embodiment, it will exemplify a case where the audio input 7 inputs human voice captured by a microphone.

The ADC 8 is an analog-digital converter for converting the analog audio signal input from the audio input 7 into digital audio data. In this embodiment, the ADC 8 carries out, for example, 16 bit AD conversion with 8,021 Hz sampling frequency. In this embodiment, audio signal input at the audio input 7 will be referred to as "original sound", and digital audio data after conversion by the ADC 7 will be referred to as "original audio data" or "original waveform data".

The sound generator 9 is a sound source device for generating various waveform data representing various sounds in accordance with the instruction given by the control unit 1. The instruction is related to the musical play by the user with operation onto the keyboard 2.

The DAC 10 is a digital-analog converter for converting the digital waveform data generated by the sound generator 9 and effected sound data output from the sound effecter 200 into analog audio signal.

The sound system 11 is an audio output unit for outputting the sound represented by the analog audio signal converted by the DAC 10. The sound system 11 may comprise an amplifier, speakers, and the like for outputting sounds.

Most of those components are connected to each other via a bus, thus are controlled by the control unit 1.

The sound effecter 200 is a pitch shifter which shifts pitch of a fundamental tone in the audio waveform input through the audio input 7 to instructed pitch (target pitch). For example, the target pitch may be instructed by a user with operating the keyboard 2. Otherwise, the target pitch may be instructed by any sound controllable data such as MIDI, or any data received via communications network.

Figure 2:
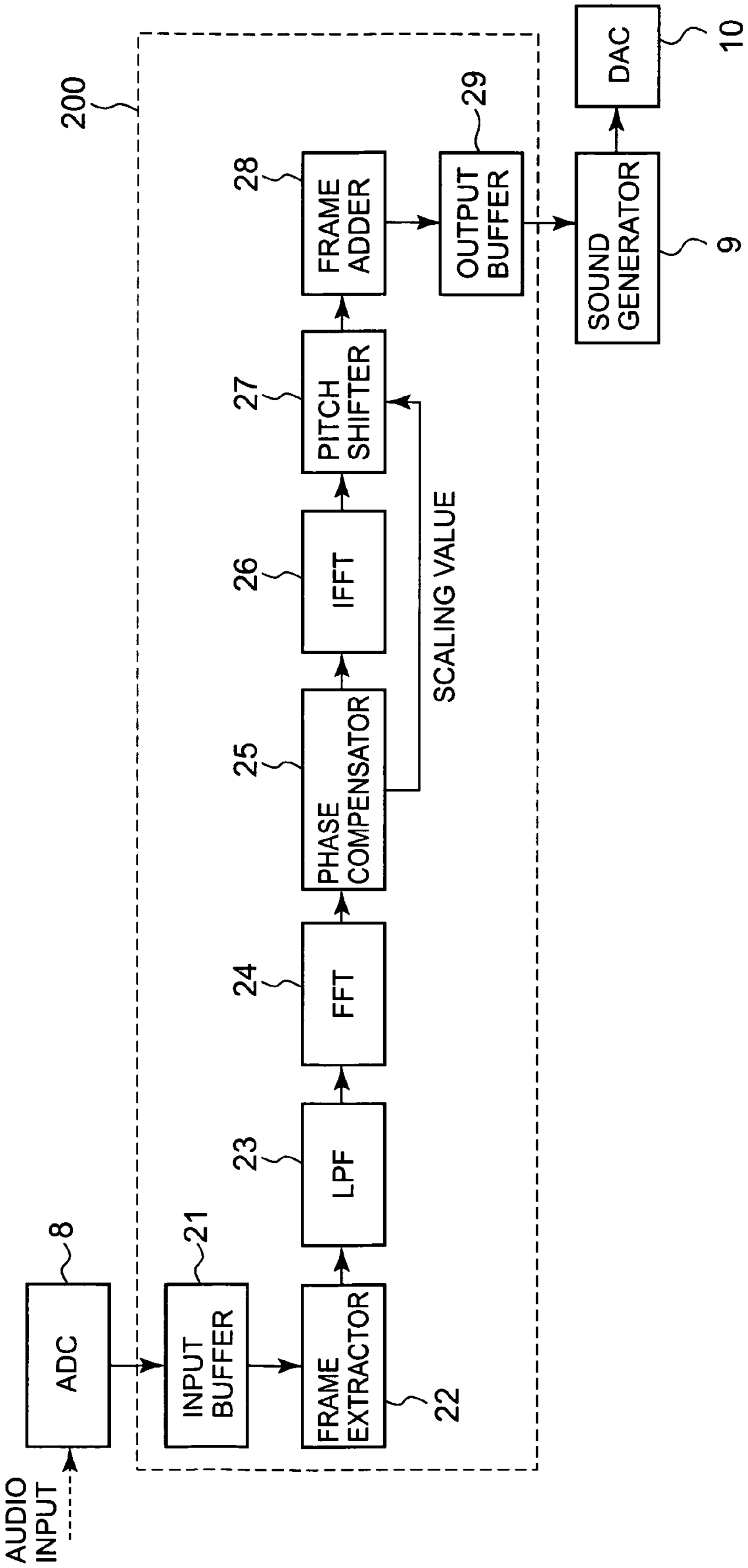
FIG. 2 is a block diagram showing the functions realized by the sound effecter according to the embodiment.

The sound effecter 200 will now be described in detail with reference to FIG. 2. FIG. 2 is a block diagram showing the functions realized by the sound effecter 200.

In this embodiment, the sound effecter 200 extracts frequency components (spectral components) at each of frequency channels after analyzing the frequency of the original waveform; shifts the extracted frequency components; and synthesizes (generates) the pitch shifted waveform with using the shifted frequency components. Thus, the waveform to which sound effect is added is generated. To realize the above operations, the sound effecter 200 comprises the following functions shown in FIG. 2.

As shown in FIG. 2, the sound effecter 200 comprises functions of an input buffer 21, a frame extractor 22, an LPF 23, an FFT 24, a phase compensator 25, an IFFT 26, a pitch shifter 27, a frame adder 28, and an output buffer 29.

The input buffer 21 is a buffering area, for example, prepared in the RAM 5 for buffering the original audio data output by the ADC 8.

The frame extractor 22 is designed for extracting frames corresponding to predetermined size from the original audio data buffered in the input buffer 21. The size, that is, the amount of the audio data (the number of samples) is, for example, 256. Since frame should be overlapped before extraction for exact phase expansion, the frame extractor 22 overlaps the frames by frame overlap factor (hereinafter, referred to as "factor OVL") before extraction. In this embodiment, a value of the factor OVL may be 4. In this case, hop size will be 64 (because 256/64=4). And, range of pitch scaling value from pitch of the original audio data (hereinafter, referred to as "original pitch") to target pitch may be 0.5-2.0.

The LPF 23 is a low pass filter which performs low pass filtering (hereinafter, referred to as "LPF") onto the-frames extracted by the frame extractor 22. The LPF 23 cancels high frequency components in order to prevent the frequency components from exceeding Nyquist frequency after pitch shifting.

The FFT 24 is a fast Fourier transformer which carries out fast Fourier transform (hereinafter, referred to as "FFT") onto the frames output from the LPF 23. The FFT 24 sets FFT size (number of sampling points) set for carrying out the FFT. The FFT size may be twice as the frame size. The FFT 24 accepts frame input having 256 samples from the LPF23. At the initial stage of the FFT, the FFT 24 sets FFT size in the first half of the frame, and sets 0 in the second half of the frame. 0 in the second half of the frame will bring the interpolation effect after FFT. According to the interpolation effect, resolution of the frequency will be improved. The FFT 24 carries out FFT onto the frames after such the settings.

The phase compensator 25 expands or shrinks the size of the frames having the frequency components in each of the frequency channels obtained after the FFT. This operation compensates the expansion or shrinkage of the frames caused by pitch shifting. For example, when a pitch scaling value is "2" which is maximum value in the range, the frame size will be ½ after pitch shifting. In this case, the phase compensator 25 expands the frame twice as original size in order to compensate (keep) the frame size. This is another reason why the FFT size is set twice as the frame size. The way to calculate the pitch scaling value will be described later.

The IFFT 26 is an inverse fast Fourier transformer which carries out inverse fast Fourier transform (hereinafter, referred to as "IFFT") onto the frequency components in each of the frequency channels after the phase compensator 25 expanded or shrunk the frame size, thus frame data are regenerated in time domain. Accordingly, audio data for 1 frame will be generated and output.

The pitch shifter 27 performs interpolation or decimation onto the frames generated by the IFFT 26 in accordance with the pitch scaling value input from the phase compensator 25, thus the pitch will be shifted. Generally known Lagrange function or sinc function may be used for the interpolation or decimation, however, Neville interpolation is employed for pitch shifting (pitch scaling) in this embodiment. After the interpolation or decimation, the frame size becomes the original size (256 samples). The audio data of such the regenerated frames will be referred to as "synthesized audio data", and sounds based on the synthesized audio data will be referred to as "synthesized sounds".

The output buffer 29 is a buffering area, for example, prepared in the RAM 5 for buffering the synthesized audio data to be output by the sound system 11 as sounds.

The frame adder 28 adds the synthesized audio data for 1 frame input from the pitch shifter 27 to the synthesized audio data buffered in the output buffer 29 by overlapping the input synthesized audio data with using the factor OVL.

The overlapped synthesized audio data in the output buffer 29 will be output to the DAC 10 via the sound generator 9 to be converted to analog signals.

This embodiment exemplifies the sound effecter 200 realized by the hardware components. However, the sound effecter 200 may be realized by software components. In this case, the components of the sound effecter 200 (except the input buffer 21 and the output buffer 29) may be realized by the control unit 1 with executing programs in ROM 5. Additionally, the ADC 8 and/or the DAC 10 may be realized by the control unit 1 in the same manner.

Method of calculating the pitch scaling value by the phase compensator 25 will now be described in detail. Hereinafter, "ρ" represents the scaling value in this embodiment.

After performing FFT, frequency components having real number components (hereinafter, referred to as "$N_{real}$") and imaginary number components (hereinafter, referred to as "$N_{img}$") are extracted in each of frequency channels whose frequencies are different from each other. Frequency amplitude (hereinafter, referred to as "$F_{amp}$") and phase (hereinafter, referred to as "phase P") will be calculated by the following equations (1) and (2).

$$F_{amp}=(N_{real}^2+N_{img}^2)^{1/2} \quad (1)$$

$$P=\arctan(N_{img}/N_{real}) \quad (2)$$

If using "arctan" for calculating the phase, phase P will be restricted to a range from $-\pi$ to $+\pi$. However, phase P must be expanded because it is an integration of angular velocity. Phase P is fundamentally obtained by the following equation (3). In this equation, a small letter θ represents convoluted phase and a large letter Θ represents expanded phase in order to be distinguishable whether expanded or not expanded. And, k represents index of the frequency channel, and t represents time.

$$\Theta_{k,t}=\theta_{k,t}+2n\pi n=0,1,2, \quad (3)$$

Accordingly, it must obtain n to expand phase P (=θ).

Steps for expansion will now be described as follows.

First, phase difference Δθ between the frames is calculated by the following equation (4) where i represents present frame. That is, i−1 represents an adjacent frame just before the present frame. Thus, $\Delta\theta_{i,k}$ represents phase difference between the present frame and the adjacent frame just before the present frame at the frequency channel k in the original waveform.

$$\Delta\theta_{i,k}=\theta_{i,k}-\theta_{i-1},k \quad (4)$$

And, central angle frequency $\Omega_{i,k}$ will be calculated by the following equation (5), where Fs represents sampling frequency while N represents number of sampling points (FFT size).

$$\Omega_{i,k}=(2\pi\cdot Fs)\cdot k/N \quad (5)$$

Phase difference $\Delta Z_{i,k}$ at the time of frequency $\Omega_{i,-k}$ will be calculated by the following equation (6) where Δt represents time difference between the present frame and the adjacent frarrie just before the present frame.

$$\Delta Z_{i,k}=\Omega_{i,k}\cdot\Delta t \quad (6)$$

The time difference Δt is calculated by the following equation (7).

$$\Delta t=N/(Fs\cdot OVL) \quad (7)$$

Since the equation (6) represents expanded phase, it is transformed to the following equation (8).

$$\Delta Z_{i,k}=\zeta_{i,k}+2n\pi \quad (8)$$

On the contrary, phase difference $\Delta\theta_{i,k}$ calculated by the equation (4) shows convoluted phase. Therefore, differences between the convoluted phase difference and the expanded phase difference will be calculated by the following equation (9) where δ represents difference between $\Delta\theta_{i,k}$ calculated by equation (4) and $\Delta\zeta_{i,k}$ calculated by equation (8).

$$\Delta\theta_{i,k}-\Omega_{i,k}\cdot\Delta t=(\Delta\zeta_{i,k}+\delta)-(\Delta\zeta_{i,k}+2n\pi)=\delta-2n\pi \quad (9)$$

Then, δ will be specified after deleting 2nπ in the right side of the equation (9) and restricting the range to $-\pi$ to $\pi$. The specified δ represents the phase difference which is actually detected from the original waveform (hereinafter, referred to as, "actual phase difference").

If another phase difference $\Delta Z_{i,k}$ is added to the actual phase difference δ like the following equation (10), expanded phase difference $\Delta\Theta_{i,k}$ will be specified.

$$\Delta\Theta_{i,k}=\delta+\Omega_{i,k}\cdot\Delta t=\delta+(\Delta\zeta_{i,k}+2n\pi)=\Delta\theta_{i,k}+2n\pi \quad (10)$$

$\Omega_{i,k}\cdot\Delta t$ will be transformed as the following equation (11) based on the equations (5) and (7).

$$\Omega_{i,k}\cdot\Delta t=((2\pi\cdot Fs)/N)\cdot k\cdot(N/(Fs\cdot OVL))=(2\pi/OVL)\cdot k \quad (11)$$

Under the discrete Fourier transform (DFT) including FFT, frequency components will be leaked (transported) to all frequency channels except some rare cases where the frequency of the frequency components in the audio data (signal) is integer number times higher than the number of sampling points at DFT. Therefore, the frequency channels actually having the frequency components should be detected based on the DFT result, when analyzing harmonic structure or the like in the signal.

A general method for such the detection, it may detect a peak of the frequency amplitude, and regard the peak as the channel where the frequency components exist. The most simple and easy way to carry out this method is to regard a channel whose frequency amplitude is larger than that of a former channel and a following channel as the peak. However, this method has demerits because it may misconceive a peak caused by side lobe of the window function. To avoid such the misconception, it should extract a channel having the least frequency amplitude among the channels indicated by the detected peaks, and determine the correct peak if the frequency amplitude concerned is equal to or lower than a predetermined value based on the peak frequency amplitude (for example, −14 db from the peak frequency amplitude).

Accordingly, the general peak detection may be load for processing because it requires 2 step searching procedure though fine peak detection is available. In this embodiment, it detects the frequency channel having the frequency components of a harmonic overtone in the original sounds based on the phases. This avoids the peak detection, thus it will be released from the heavy processing. Details of the frequency channel detection according to this embodiment will now be described with reference to the drawings.

Figure 3:
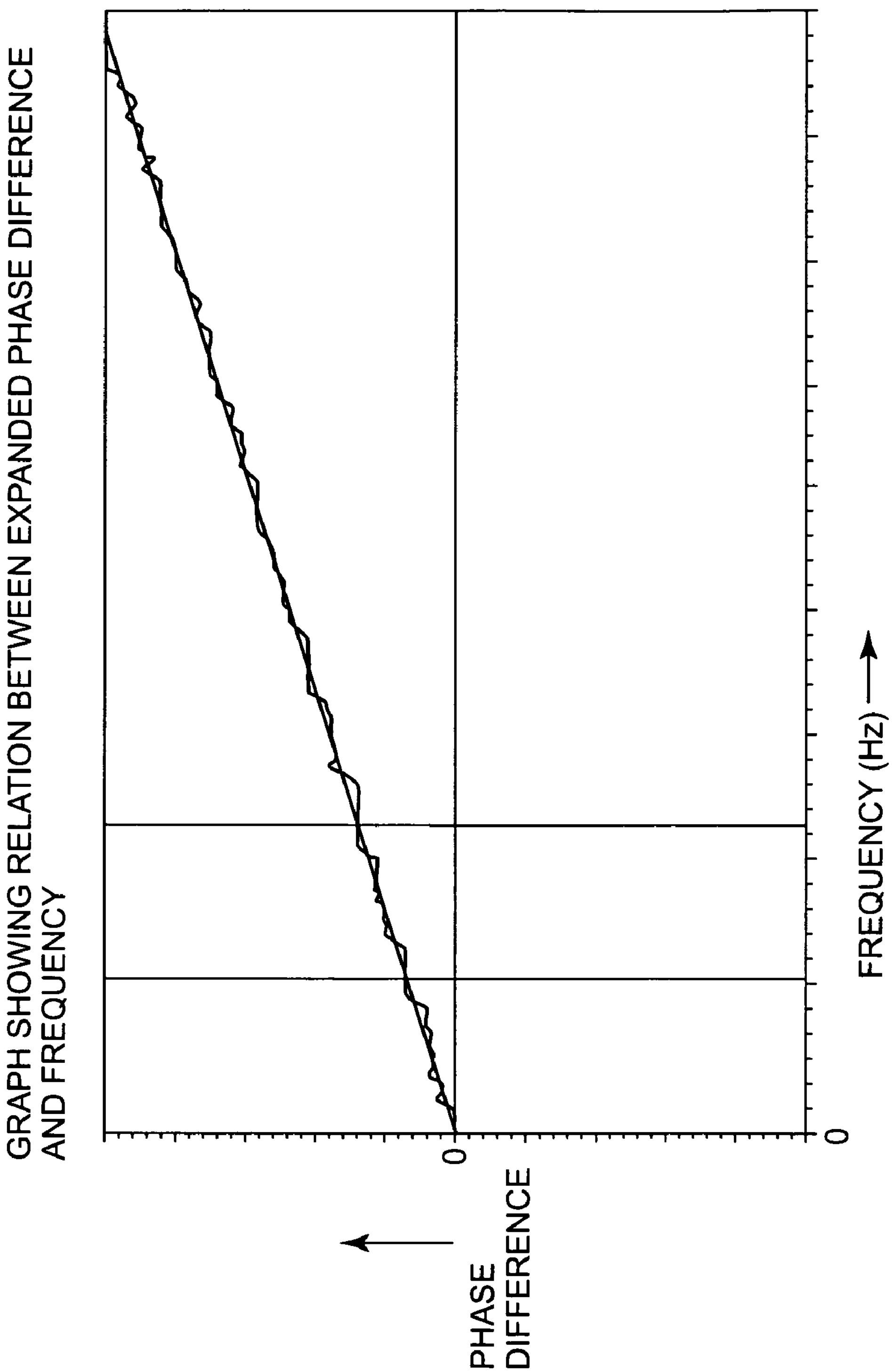
FIG. 3 is a graph showing the relation between expanded phase difference and frequency.

FIG. 3 shows a graph for explaining the relation between expanded phase difference and frequency. In the graph, a vertical axis represents the phase difference while a horizontal axis represents the frequency. A straight line in the graph represents the phase difference calculated based on the central frequency of each channel, that is, $\Delta Z_{i,k}$ calculated by the equation (6). A plotted line along the straight line represents sounds having the harmonic structure, that is, the expanded phase difference $\Delta\Theta_{i,k}$ calculated by the equation (10). The graph shows the phase difference $\Delta\Theta_{i,k}$ for 128 sampling points of 512 sampling points (FFT size).

In case of harmonic structured sounds, the plotted line shows terraced form around the frequency channels each having the frequency components corresponding to the harmonic overtone of the sounds, as shown in FIG. 3. This is caused by frequency components leaking. That is, the frequency components in the frequency channel leak to nearby channels. Based on such the fact, the frequency components of the harmonic overtone may exist in the frequency channel corresponding to a cross point of the terraced form plotted line and the straight line. In FIG. 3, vertical lines indicate such the cross points.

The frequency channel at the cross point (hereinafter, referred to as "harmonic channel") may be calculated by the equations (10) and (6), however, the processing may be heavy. In this embodiment, it detects the harmonic channel with using the actual phase difference δ calculated by the equation (9).

As described above, the actual phase difference δ represents the difference between $\Delta\theta_{i,k}$ calculated by the equation (4) and $\Delta\zeta_{i,k}$ calculated by the equation (8). The farther away from the channel actually having the frequency components, the greater δ becomes, while the closer to the channel, the smaller δ becomes. Therefore, if δ crosses 0 (hereinafter, referred to as "zero cross") over the channels with enlarging the frequency, he farther away from the channel, the greater an absolute value of δ becomes toward negative side. Hereinafter, forms (lines) of the graphs will be expressed in view of a situation where the frequency becomes larger (note that there are some exceptional cases).

Figure 4:
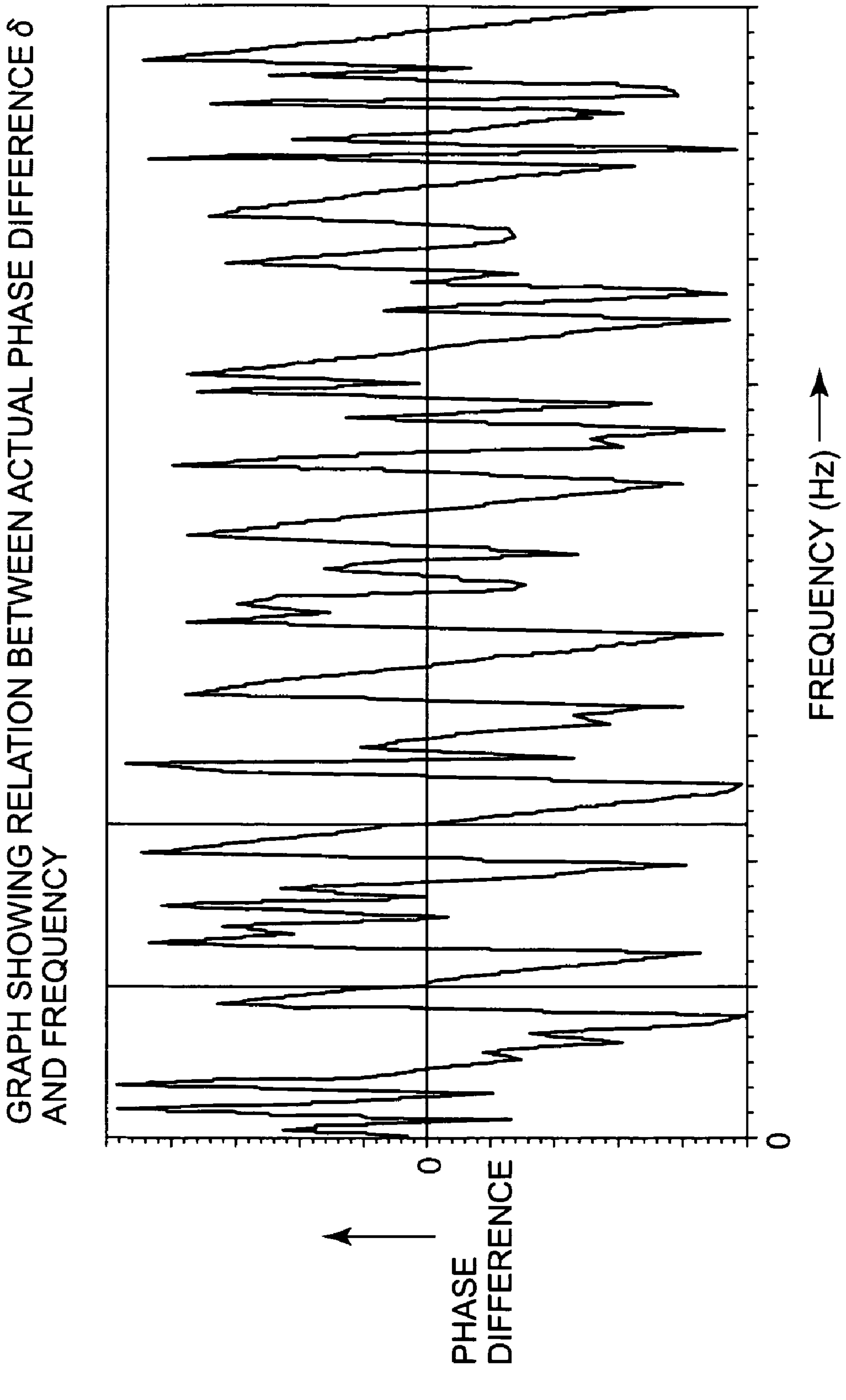
FIG. 4 is a graph showing the relation between actual phase difference δ and frequency.

FIG. 4 shows a graph for explaining the relation between actual phase difference δ and frequency. Both the graphs shown in FIG. 3 and FIG. 4 show the results where the same sound source is used. As well as FIG. 3, a vertical axis of the graphs represents the phase difference and a horizontal axis of the graphs represents the frequency. This graph also has some vertical lines which correspond to those shown in the graph of FIG. 3. As described above, the vertical lines in the graph of FIG. 3 correspond to the zero cross points. In FIG. 4, the plotted line representing the actual phase difference δ shows zero crosses at the vertical lines. Accordingly, the harmonic channel will be found if the zero cross points are detected.

It is obvious from the graph in FIG. 4, other zero crossings appearing at points where adjoining harmonic overtones are mixed. In this embodiment, a frequency channel having index k which fulfills the following condition (C1) (hereinafter, referred to as "zero-cross determining condition") is determined as the harmonic channel including the frequency components of the harmonic overtone. The frequency channel having the index k is the nearest frequency channel to the zero cross point.

$$\delta[k-2]>\delta[k-1]>\delta[k]>\delta[k+1]>\delta[k+2] \qquad (C1)$$

If a frequency channel having the index k which fulfills the zero-cross determining condition is found, the frequency channel is the nearest one to a zero cross point where the actual phase difference remarkably changes from positive side to negative side. Then, such the frequency channel will be extracted as the harmonic channel. According to this method, exact extraction of the harmonic channel is realized instead of the conventional frequency amplitude based harmonic extraction which is often unsuccessful when the number of samples for FFT is poor. If more fine extraction is required, additional peak detection may be allowable.

In this embodiment, it will detect 2 harmonic channels in frequency order (lower to higher), because the precision of the extraction will be poor by errors as the frequency becomes higher. Hereinafter, the indexes of the extracted 2 harmonic channels will be referred to as "hm1" and "hm2" in frequency order (lower to higher). Especially, hm1 will be also called as "reference index", and the harmonic channel having the reference index hm1 will be called as "reference channel".

The phase difference $\Delta\Theta_{i,k}$ (k=hm1, hm2) in each of the harmonic channel is calculated by the equation (10). That is, it is calculated by adding $\Omega_{i,k}\cdot\Delta t$ obtained by the equation (11) to the actual phase difference δ of the channel.

The pitch scaling value ρ will be calculated based on the harmonic channel detection in accordance with the following process.

The phase compensator 25 calculates the greatest common divisor between the frequencies corresponding to the indexes hm1 and hm2 of the detected 2 harmonic channels. The greatest common divisor may be calculated with using Euclidean algorithm. The greatest common divisor gcd (x, y) between 2 integers x and y (not negative) will be obtained by repeating the recurrent calculation of the following equation (12) where "x mod y" represents residue after dividing x by y.

$$gcd(x, y) = \begin{cases} x & \text{if } y = 0 \\ gcd(y, x \bmod y) & \text{if } y \neq 0 \end{cases} \qquad (12)$$

This is an example, and the greatest common divisor gcd (x, y) may be obtained by other method.

In this embodiment, it exemplifies human voice as the original sound. In this case, the lowest frequency of the original sound may be 80 Hz, and the index value may be set in accordance with the frequency, that is, "6". Under this condition, a condition y<6 is applied to the equation (12) for the case y=0. The calculated greatest common divisor will be represented by x.

The greatest common divisor x will be obtained regardless of the fundamental tone whether a frequency channel corresponding to the fundamental tone is successfully extracted as the harmonic channel. Therefore, the harmonic channel will be extracted exactly even if the fundamental frequency is missed (so called, missing fundamental) or the fundamental frequency is very poor rather than the other frequencies.

After calculating the greatest common divisor x, the phase compensator 25 calculates a multiple hmx. The multiple hmx represents a ratio of the frequency corresponding to the reference index hm1 against the greatest common divisor x. That is, the multiple hmx will be obtained by calculating the following equation (13).

$$hmx=hm1/x \qquad (13)$$

Thus obtained hmx corresponds to a value after dividing the frequency corresponding to the reference channel by the fundamental frequency (frequency of the fundamental tone).

Another phase difference $\Delta\Theta_d$ corresponding to expanded target pitch will be obtained by multiplying the multiple hmx. That is, $\Delta\Theta_d$ will be obtained by calculating the following equation (14) where "Fd" represents the fundamental frequency [Hz] of the target pitch.

$$\Delta\Theta_d\cdot hmx=2\pi Fd\cdot\Delta t\cdot hmx=(2\pi Fd\cdot hms\cdot N)/(Fs\cdot OVL) \qquad (14)$$

The pitch scaling value ρ for converting the pitch of the original sound to the target pitch will be obtained by calculating the following equation (15).

$$\rho=\Delta\Theta_d\cdot hmx/\Delta\Theta_{i,hm1} \qquad (15)$$

The phase compensator 25 shown in FIG. 2 thus calculates the scaling value ρ and outputs it to the pitch shifter 27. The pitch shifter 27 carries out the pitch shifting with using the scaling value ρ to shift the pitch.

The phase compensator 25 also carries out phase scaling by calculating the following equation (16).

$$\theta'_{i,k}=\Delta\Theta_{i,k}((\theta'_{i-1,hm1}-\theta_{i-1,hm1})/\Delta\Theta_{i,hm1}+(\rho-1))+\theta_{i,k} \tag{16}$$

In the above equation (16), the phase difference obtained by the scaling is marked by apostrophe. According to the scaling by calculating the equation (16), both the horizontal phase coherence and the vertical phase coherence are conserved.

The phase compensator 25 calculates another real number components (hereinafter, referred to as "$N'_{real}$") and imaginary number components (hereinafter, referred to as "$N'_{img}$") based on phase P' after scaling of the equation (16) and the $F_{amp}$ calculated by the equation (1) with using Euler's formula, and converts them to complex frequency components by calculating the following equations (17) and (18).

$$N'_{real}=F_{amp}\cdot\cos(P') \tag{17}$$

$$N'_{img}=F_{amp}\cdot\sin(P') \tag{18}$$

The IFFT 26 inputs thus converted frequency components at every frequency channel from the phase compensator 25, and carries out IFFT so as to generate the frame data in time domain. The pitch shifter 27 carries out pitch scaling onto the frames generated by the IFFT 26 by interpolation or decimation in accordance with the pitch scaling value ρ given by the phase compensator 25. Though data amount is expanded or shrunk 1/ρ after this operation, the expansion/shrinkage is canceled because the phase compensator 25 also performs ρ times phase scaling (equation (16)). Thus, the data amount is kept as the original. Since the frame adder 28 adds thus obtained frames by overlapping, the sound system 11 will output the synthesized sounds having the target pitch.

Figure 6:
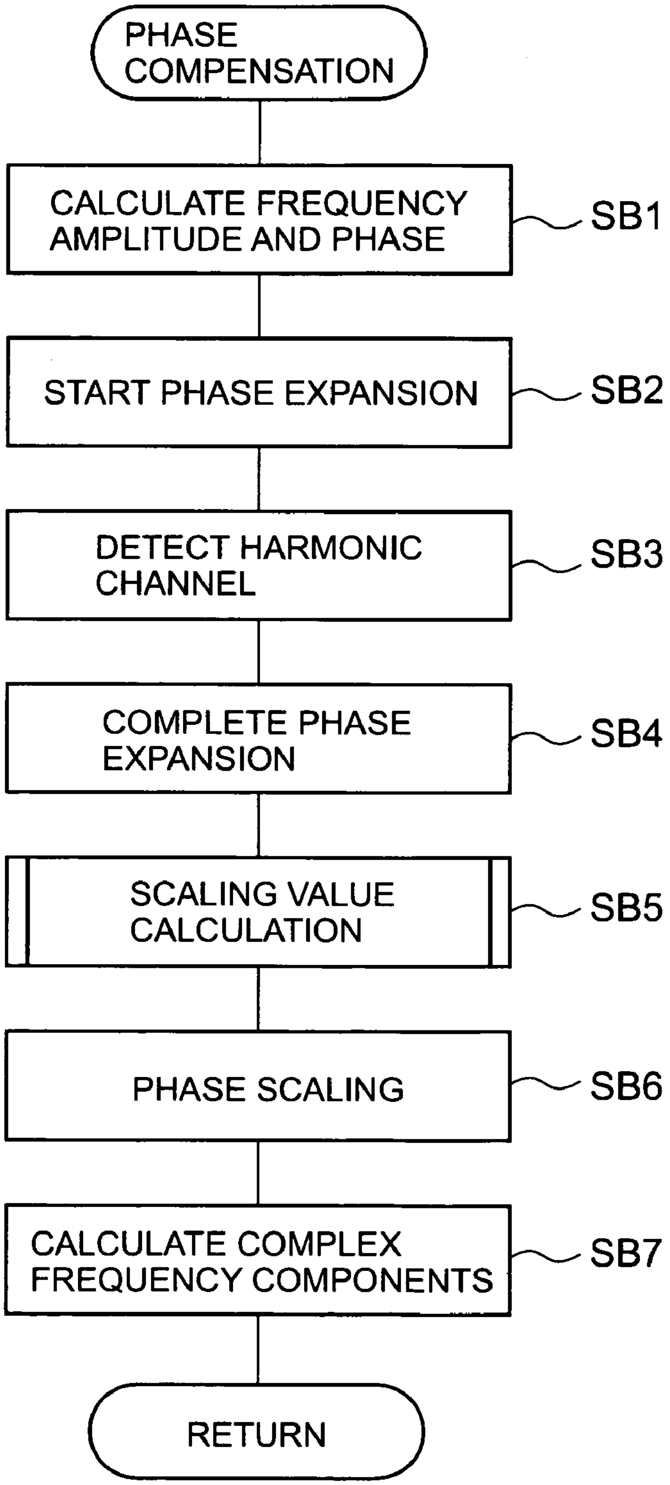
FIG. 6 is a flowchart for explaining phase compensation.
Figure 7:
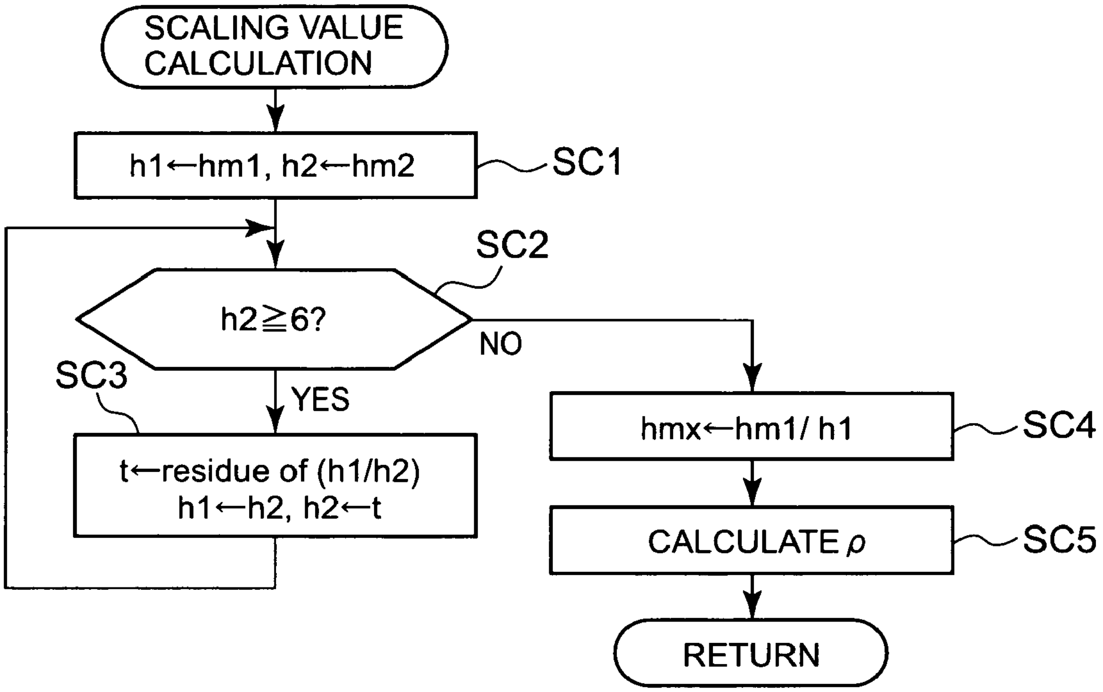
FIG. 7 is a flowchart for explaining scaling value calculation.

Operations of the electronic musical instrument 100 having the above structured sound effecter 200 will now be described with reference to the flowcharts shown in FIGS. 5 to 7.

Figure 5:
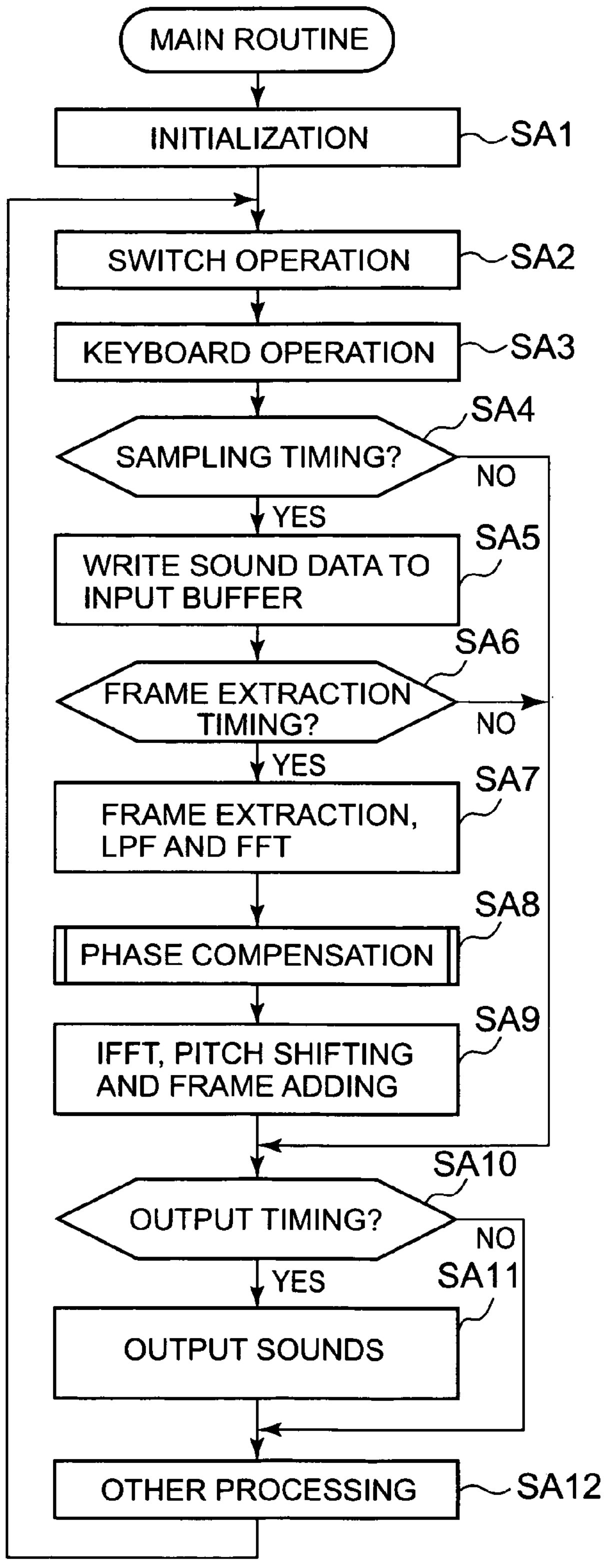
FIG. 5 is a flowchart for explaining general processing.

FIG. 5 shows a general flowchart according to this embodiment. The general processing is realized by the control unit 1 which executes the programs in the ROM 4 with using any resources of the electronic musical instrument 100.

After the electronic musical instrument 100 is turned on, initialization is performed at step SA1. At the following step SA2, switch operation caused by the operation onto the switch console 3 by the user is performed. Through the switch operation, for example, the detector circuits of the switch console 3 detect the states of each switch, and the control unit 1 receives the result of the detection. And the control unit 1 analyzes the detection to specify the switches whose state is changed.

A keyboard operation is then carried out at step SA3. Through the keyboard operation, the sound system 11 outputs sounds corresponding to the user's musical play with using the keyboard 2.

After the keyboard operation, the control unit 1 determines whether it is timing for outputting the original sound data from the ADC 8 at step SA4. If it is the timing (SA4: Yes), the original sound data is buffered in the input buffer 21 on the RAM 5 at SA5, then the process forwards to step SA6. If it is not the timing (SA4: No), the process jumps to step SA10.

At step SA6, the control unit 1 determines whether it is timing for frame extraction or not. At this step, if time for sampling the original sound data for the hop size has been passed from the former timing, the control unit 1 determines that it is the timing (SA6: Yes), and the process forwards to step SA7. If it is not the timing (SA6: No), the process jumps to step SA10.

At step SA7, the sound effecter 200 extracts the original sound data for 1 frame from the input buffer 21, and the sound effecter 200 performs LPF for canceling high frequency components and FFT in order. The processes at step SA7 are performed by the frame extractor 22, the LPF 23, and the FFT 24.

At the following step SA8, the sound effecter 200 performs phase compensation onto the frequency components of each channel obtained after the FFT. The processes at this step are performed by the phase compensator 25. The process forwards to step SA9.

At step SA9, the sound effecter 200 performs IFFT onto the frequency components of each channel after the phase compensation, and pitch shifting by time scaling process onto the audio data for 1 frame obtained after the IFFT. And the sound effecter 200 overlaps the synthesized audio data obtained after the pitch shifting process to the synthesized audio data in the output buffer 29 by overlapping. The processes at this step are performed by the IFFT 26, the pitch shifter 27, and the frame adder 28. Then, the process forwards to step SA10.

At step SA10, the control unit 1 determines whether it is timing for output the synthesized audio data for 1 sampling cycle. If it is the timing (SA10: Yes), the control unit 1 instructs the sound effecter 200 to output the synthesized sound data. Accordingly, the sound effecter 200 outputs the synthesized sound data buffered in the output buffer 29 to the DAC 10 via the sound generator 9. Note that the sound generator 9 has sound mix function to mix the waveform generated by the sound generator 9 itself with the effected sound generated by the sound effecter 200. The DAC 10 converts thus mixed sound data to analog sound signal to be output at the sound system 11.

Then the process goes back to step SA2 after other processing is performed at step SA12. In a case where it is determined that it is not the output timing (SA10: No), the other processing is performed at step SA12.

The phase compensation process performed at step SA8 in the general processing shown in FIG. 5 will now be described in detail with reference to FIG. 6. FIG. 6 shows a flowchart for explaining the phase compensation process performed by the phase compensator 25 in the sound effecter 200. Before starting the process, the phase compensator 25 receives the frequency components of each frequency channel obtained by the FFT. As mentioned before, the frequency components include real number components and imaginary number components.

At step SB1, the phase compensator 25 obtains frequency amplitude $F_{amp}$ and phase P(=θ) by calculating the equations (1) and (2) based on the frequency components of each frequency channel.

Then, the phase compensator 25 calculates the equations (4) to (10) to obtain expanded phase difference $\Delta\Theta_{i,k}$ (see FIG. 3) at step SB2, and the process forwards to step SB3 when actual phase difference δ is obtained (before calculating the equation (10)).

At step SB3, the phase compensator 25 detects 2 harmonic channels based on the actual phase difference δ (see FIG. 4) obtained at SB2, and the process forwards to step SB4.

The phase compensator 25 calculates the equation (10) at step SB4 to obtain phase difference $\Delta\Theta_{i,k}$ of each phase channel. After the calculation, the process forwards to step SB5.

At step SB5, the phase compensator 25 calculates the equations (12) to (15) onto the 2 harmonic channels detected at SB3 to obtain the scaling value ρ. That is, the phase compensator 25 performs scaling value calculation process at step SB5.

The scaling value calculation process will now be described in detail with reference to FIG. 7. FIG. 7 shows a flowchart for explaining the scaling value calculation process.

At step SC1, the phase compensator 25 substitutes index values hm1 and hm2 for parameters h1 and h2 respectively. hm1 and hm2 are index values of the 2 harmonic channels detected at step SB3. The parameters h1 and h2 correspond to x and y in the equation (12) respectively.

Then the phase compensator 25 determines whether the index value corresponding to the parameter h2 is equal to or greater than 6 or not at step SC2. This determination may be performed by the control unit 1 instead of the phase compensator 25.

If the index value is equal to or greater than 6 (SC2: Yes), the process forwards to step SC3. At step SC3, the phase compensator 25 substitutes residue after dividing the parameter h1 by the parameter h2 with another parameter t, substitutes the parameter h1 with the parameter h2, and substitutes the parameter t with the parameter h2. After those substitutions, the process goes to step SC2. At step SC2, it is determined whether the updated parameter h2 is equal to or greater than 6 or not.

Thus, such the looped processing is performed repeatedly until it is determined "No" at step SC2. According to this looped processing, the greatest common divisor between the frequencies corresponding to the index values h1 and h2 is substituted with the parameter h1.

If it is determined that the parameter h2 is not equal to or greater than 6 (SC2: No), the process jumps to step SC4.

At step SC4, the phase compensator 25 substitutes a resultant value after dividing the frequency corresponding to the index value h1 by the parameter h1 (that is, the greatest common divisor) with another parameter hmx (equation (13)).

Then, the phase compensator 25 multiplies the phase difference $\Delta\Theta_d$ by the parameter hmx (equation (14)), and obtains the scaling value ρ by calculating the equation (15) with using the result of the multiplication. As the scaling value ρ is calculated, the process is terminated and returns to the phase compensation process shown in FIG. 6.

The process forwards to step SB6, and the phase compensator 25 performs phase scaling process by calculating the equation (16) with using the phase difference $\Delta\Theta_{i,k}$ calculated at step SB4.

At the following step SB7, the phase compensator 25 obtains real number components $N'_{real}$ and imaginary number components $N'_{img}$ by calculating the equations (17) and (18) respectively, with using the phase P' after the scaling process and the frequency amplitude $F_{amp}$ obtained by calculating the equation (1). The phase compensator 25 further converts the obtained real number components $N'_{real}$ and imaginary number components $N'_{img}$ to complex frequency components. After such the complex conversion is completed, the process is terminated.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

For example, though the embodiment has exemplified the case where 2 harmonic channels are extracted, it may be designed to extract 3 or more harmonic channels.

If the peak detection is employed for finer detection, it may be designed to extract 2 or more harmonic channels based on frequency amplitudes from harmonic channels detected based on the actual phase differences.

Generally, transportation of formant occurs by the pitch shifting. In this case, the synthesized sound will be affected worse as shift amount (scaling value ρ) becomes greater. To avoid such the problem, it may be designed to perform additional processing for formant compensation.

Since the fine pitch shifting without extracting the fundamental frequency of the original sound is achieved by the present invention, the above embodiment has not exemplified a method for extracting the fundamental frequency. However, the fundamental frequency may be obtained easily with using the multiple hmx according to the above embodiment. The fundamental frequency (Fi) will be obtained (extracted) by calculating the following equation (19) based on the equation (7).

$$Fi=\Delta\Theta_{i,hm1}/(2\pi\cdot\Delta t\cdot hmx)=(\Delta\Theta_{i,hm1}\cdot Fs\cdot OVL)/(2\pi\cdot N\cdot hmx) \quad (19)$$

Accordingly, the sound effecter 200 or the electronic musical instruments 100 having the sound effecter 200 may act as a fundamental tone extractor which easily extracts fundamental tone (fundamental frequency) by calculating the equation (19).

This structure allows another optional case where the target pitch is indicated by frequency. In this case, it is able to obtain a ratio of the target pitch frequency to the fundamental frequency Fi because the fundamental frequency Fi is available. Then, the scaling value ρ will be obtained based on the ratio.

The extracted fundamental frequency Fi may be noticed to the user with indication by the display unit 6 or the like.

Various modifications on the synthesized waveform generation may be employed.

As described above, the sound effecter 200 according to the present invention may be realized by software components. Additionally, the fundamental tone (fundamental frequency) extracting function may also be realized by software. Those functions including the above modifications are realized by applying programs to a computer controllable apparatuses or devices, for example, the electronic musical instrument, a personal computer, and the like. Such the programs may be stored in an appropriate recording medium for example, CD-ROM, DVD, optical-magneto disk, and the like for distribution. Or, the programs may be distributed completely or partially via communications medium such as telecommunications network. A user is able to obtain such the distributed programs from the recording medium or the communications medium and apply them to a data processing apparatus such as a computer, to realize the sound effecter according to the present invention.

What is claimed is:

1. A sound effecter comprising:

a frequency components extractor which analyzes frequencies of an input first audio waveform frame by frame and extracts frequency components at a plurality of frequency channels;

a harmonic channel extractor which extracts 2 or more of the frequency channels as harmonic channels each including a frequency component of a harmonic overtone whose frequency is 1 or more times higher than a frequency of a fundamental tone of the first audio waveform;

a greatest common divisor calculator which calculates a greatest common divisor between frequencies corresponding to the 2 or more frequency channels extracted by said harmonic channel extractor;

an audio waveform generator which converts a pitch of said first audio waveform to generate a second audio waveform;

a ratio calculator which sets one of the 2 or more frequency channels extracted by said harmonic channel extractor as a reference channel, and which calculates a ratio of the greatest common divisor to a frequency of the reference channel;

a multiplier which multiplies a phase difference between frames at a target fundamental tone in the second audio waveform by the calculated ratio to obtain a target phase difference; and a controller which determines parameters for pitch conversion by calculating a phase difference ratio between the calculated target phase difference and a phase difference between frames at the reference channel.

2. The sound effecter according to claim 1, wherein said harmonic channel extractor calculates phases from the frequency components of each frequency channel extracted by said frequency channel extractor, and extracts the 2 or more frequency channels based on the calculated phases.

3. The sound effecter according to claim 1, further comprising a fundamental tone extractor which extracts the frequency of the fundamental tone of the first audio waveform based on the greatest common divisor calculated by said greatest common divisor calculator.

4. A method for extracting a fundamental tone, comprising:

extracting frequency components at a plurality of frequency channels by analyzing frequencies of an input audio waveform frame by frame;

extracting, based on calculated phases from the extracted frequency components of each frequency channel, 2 or more of the frequency channels as harmonic channels each having a frequency component of a harmonic overtone whose frequency is 1 or more times higher than a frequency of a fundamental tone of the audio waveform;

calculating a greatest common divisor between frequencies corresponding to the extracted 2 or more frequency channels;

setting one of the extracted 2 or more frequency channels as a reference channel;

obtaining a resultant value by dividing a frequency of the reference channel by the greatest common divisor;

calculating a phase difference between frames of the fundamental tone of the audio waveform obtained by dividing a phase difference between frames of the reference channel by the resultant value;

converting the phase difference between frames of the fundamental tone of the audio waveform to a pitch of the fundamental tone of the audio waveform; and outputting a sound in accordance with the conversion.

5. A computer program stored on a computer-readable medium for causing a computer to perform functions of:

extracting frequency components at a plurality of frequency channels by analyzing frequencies of a first audio waveform frame by frame;

extracting 2 or more of the frequency channels as harmonic channels each including a frequency component of a harmonic overtone whose frequency is 1 or more times higher than a frequency of the first audio waveform;

calculating a greatest common divisor between frequencies corresponding to the extracted 2 or more frequency channels;

converting a pitch of said first audio waveform to generate a second audio waveform;

setting one of the extracted 2 or more frequency channels as a reference channel and calculating a ratio of the greatest common divisor to a frequency of the reference channel;

multiplying a phase difference between frames at a target fundamental tone in the second audio waveform by the calculated ratio to obtain a target phase difference;

determining parameters for pitch conversion by calculating a phase difference ratio between the calculated target phase difference and a phase difference between frames at the reference channel; and outputting a sound in accordance with the determined parameters.

6. A computer program stored on a computer-readable medium for causing a computer to perform functions of:

extracting frequency components at a plurality of frequency channels by analyzing frequencies of an input audio waveform frame by frame;

extracting, based on calculated phases from the extracted frequency components of each frequency channel, 2 or more of the frequency channels as harmonic channels each having a frequency component of a harmonic overtone whose frequency is 1 or more times higher than a frequency of a fundamental tone of the audio waveform;

calculating a greatest common divisor between frequencies corresponding to the extracted 2 or more frequency channels;

setting one of the 2 or more frequency channels as a reference channel;

obtaining a resultant value by dividing a frequency of the reference channel by the greatest common divisor;

calculating a phase difference between frames of the fundamental tone of the audio waveform obtained by dividing a phase difference between frames of the reference channel by the resultant value;

converting the phase difference between frames of the fundamental tone of the audio waveform to a pitch of the fundamental tone of the audio waveform; and outputting a sound in accordance with the conversion.

* * * * *